United States Patent
Zhang et al.

(10) Patent No.: US 11,227,622 B2
(45) Date of Patent: Jan. 18, 2022

(54) SPEECH COMMUNICATION SYSTEM AND METHOD FOR IMPROVING SPEECH INTELLIGIBILITY

(71) Applicant: BEIJING DIDI INFINITY TECHNOLOGY AND DEVELOPMENT CO., LTD., Beijing (CN)

(72) Inventors: Yi Zhang, Mountain View, CA (US); Hui Song, Beijing (CN); Yongtao Sha, Beijing (CN); Si Qin, Beijing (CN)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 306 days.

(21) Appl. No.: 16/314,526

(22) PCT Filed: Dec. 6, 2018

(86) PCT No.: PCT/CN2018/119627
§ 371 (c)(1),
(2) Date: Dec. 31, 2018

(87) PCT Pub. No.: WO2020/113532
PCT Pub. Date: Jun. 11, 2020

(65) Prior Publication Data
US 2021/0225388 A1 Jul. 22, 2021

(51) Int. Cl.
*G10L 21/0364* (2013.01)
*G10L 15/08* (2006.01)
*G10L 21/0232* (2013.01)

(52) U.S. Cl.
CPC .......... *G10L 21/0364* (2013.01); *G10L 15/08* (2013.01); *G10L 21/0232* (2013.01)

(58) Field of Classification Search
CPC .. G10L 21/0364; G10L 21/0232; G10L 15/08
(Continued)

(56) References Cited

U.S. PATENT DOCUMENTS 6,988,066 B2    1/2006  Malah
8,489,393 B2    7/2013  Alves et al.
(Continued)

FOREIGN PATENT DOCUMENTS

CN    101226746 A    7/2008
CN    102984634 A    3/2013

OTHER PUBLICATIONS

Speech Intelligibility Enhancement Using Tunable Equalization Filter Pinaki Shankar Chandal and Sungjin Park2 (Year: 2007).*
(Continued)

*Primary Examiner* — Akwasi M Sarpong
(74) *Attorney, Agent, or Firm* — Sheppard Mullin Richter & Hampton LLP

(57) ABSTRACT

A speech communication system for improving speech intelligibility may comprise one or more processors; and a memory storing instructions that, when executed by the one or more processors, cause the system to perform: determining a cutoff frequency based on an estimation of a spectrum of noise, wherein the cutoff frequency defines a noise dominant region of frequency; lifting a spectrum of a speech above the noise dominant region of frequency, wherein a frequency range of the spectrum of the speech increases by the cutoff frequency; and applying an adaptive filter to the speech to achieve echo cancelation, wherein the adaptive filter is controlled by a volume of the noise.

20 Claims, 10 Drawing Sheets

(58) Field of Classification Search
USPC .............................. 704/226; 379/406.08; 1/1
See application file for complete search history.

(56) References Cited

U.S. PATENT DOCUMENTS

| | | | | |
|---|---|---|---|---|
| 9,589,573 | B2* | 3/2017 | Harvey | ............... G10L 21/0232 |
| 9,721,584 | B2* | 8/2017 | Chatlani | ............... H04M 9/082 |
| 10,482,896 | B2* | 11/2019 | Kjems | ................... G10L 21/038 |
| 2004/0097212 | A1* | 5/2004 | Matsumoto | ......... H04L 27/3809 |
| | | | | 455/296 |
| 2007/0019803 | A1* | 1/2007 | Merks | .................. H04M 9/082 |
| | | | | 379/406.08 |
| 2008/0195392 | A1 | 8/2008 | Iser et al. | |
| 2010/0060350 | A1* | 3/2010 | Zhang | ............... H03H 11/1291 |
| | | | | 327/553 |
| 2011/0249843 | A1 | 10/2011 | Holmberg et al. | |
| 2015/0142425 | A1* | 5/2015 | Sjoberg | .................. G10L 19/26 |
| | | | | 704/226 |
| 2016/0155453 | A1* | 6/2016 | Harvey | ................... G10L 25/18 |
| | | | | 381/26 |
| 2016/0372133 | A1* | 12/2016 | Daniel | .................... G10L 25/15 |
| 2017/0125033 | A1* | 5/2017 | Kjems | ................. G10L 21/0316 |
| 2017/0345439 | A1* | 11/2017 | Jensen | ................. H04R 25/505 |

OTHER PUBLICATIONS

PCT International Search Report and the Written Opinion dated Sep. 18, 2019, issued in related International Application No. PCT/CN2018/119627 (7 pages).

Yamato Ohtani et al., "GMM-based bandwidth extension using sub-band basis spectrum model", Proc. Intl. Conf. Speech Comm. Assn. (INTERSPEECH), 2014.

S. Chennoukh et al., "Speech Enhancement via Frequency Bandwidth Extension Using Line Spectral Frequencies", Acoustics, Speech, and Signal Processing, 1988, ICASSP-88., 1988 International Conference, Feb. 2001.

Markus V.S. Lima et al., "Sparsity-Aware Data-Selective Adaptive Filters", IEEE Transactions on Signal Processing, vol. 62, No. 17, Sep. 1, 2014.

Paulo S.R. Diniz et al., "Feature LMS Algorithms", Proc. Intl. Conf. Acoust., Speech, Signal Processing , ICASSP 2018, pp. 4144-4148.

Pinaki Shankar Chanda et al., "Speech Intelligibility Enhancement Using Tunable Equalization Filter", Proc. Intl. Conf. Acoustc., Speech, Signal Processing (ICASSP), 2007.

Rainer MARTIN, "Noise Power Spectral Density Estimation Based on Optimal Smoothing and Minimum Statistics", IEEE Transactions on Speech and Audio Processing, vol. 9, No. 5, Jul. 2001, pp. 504-512.

Harvey Fletcher et al., "Loudness, Its Definition, Measurement and Calculation", The Journal of the Acoustical Society of America, 5, 82, Oct. 1933.

Donald L. Duttweiler, "Proportionate Normalized Least-Mean-Squares Adaptation in Echo Cancelers", IEEE Transactions on Speech and Audio Processing, vol. 8, No. 5, Sep. 2000, pp. 508-518.

\* cited by examiner

300

```
for each subband
   calculate instantaneous iSNR(k)
   smooth iSNR(k) over frames and adjacent subbands to obtain SNR(k)
end sumPower = 0
cutoff frequency = 0
for subband k=1 to K (K is the upper searching limit, e.g., 1500Hz)
   if SNR(k) > Th
      cutoff frequency = k-1;
      return;
   else
      sumPower = sumPower + noise_power(k)
      if sumPower > totalPower * 0.7
         cutoff frequency = k
         return
      end
   end
end
```

FIG. 3

SPEECH COMMUNICATION SYSTEM AND METHOD FOR IMPROVING SPEECH INTELLIGIBILITY

CROSS REFERENCE TO RELATED APPLICATION

This application is a national phase application of International Application No. PCT/CN2018/119627, filed on Dec. 6, 2018, and entitled "Speech Communication System And Method For Improving Speech Intelligibility," the entire contents of which are incorporated herein by reference.

TECHNICAL FIELD

The disclosure relates generally to audio signal processing, and in particular, to speech communication system and method for improving speech intelligibility.

BACKGROUND

Speech enhancement techniques have been widely used in automobile communication systems, including acoustic echo cancellation (AEC) and noise reduction (NR). However, the current techniques aim to improve the perceptual and intelligible quality of speech for the far-end users, rather than near-end users (e.g., driver or passenger in the car). Therefore, when strong ambient noise exists in the cabin such as engine noise, road noise, or even wind noise, the speech from the loudspeaker is corrupted, which costs much attention from the drivers to understand, causing safety issues due to the distraction from driving.

One solution is to improve the sealing of cabin to passively reduce the cabin noise, or apply active noise control (ANC) to reduce the engine noise, both of which are costly. An alternative way, which is more common, is to increase the loudspeaker volume to achieve a better signal-to-noise ratio (SNR). However, high loudspeaker volume often causes discomfort and listening fatigue of the listeners.

There is a need for a method and system to improve the speech intelligibility during strong ambient noise, as well as a sparsity adaptive filter for echo cancellation to reduce computational cost.

SUMMARY

One aspect of the present disclosure is directed to a computer-implemented method for improving speech intelligibility. The method may comprise: determining a cutoff frequency based on an estimation of a spectrum of noise, wherein the cutoff frequency defines a noise dominant region of frequency; lifting a spectrum of a speech that is within the noise dominant region of frequency to a sub-band of frequency higher than the cutoff frequency; and applying an adaptive filter to the speech to achieve echo cancelation, wherein the adaptive filter is controlled by a volume of the noise.

In some embodiments, determining the cutoff frequency based on the estimation of the spectrum of the noise may comprise: receiving a sound signal through a microphone of the system; estimating the spectrum of the noise in the sound signal; estimating a Signal-Noise-Ratio (SNR) of the sound signal; and determining the cutoff frequency based on the spectrum of the noise and the SNR.

In some embodiments, the SNR may be an instantaneous SNR, and the instantaneous SNR may be smoothed over frames of the sound signal and adjacent sub-bands of frequency.

In some embodiments, determining the cutoff frequency based on the spectrum of the noise and the SNR may comprise: from a lowest sub-band of frequency to an upper frequency limit of the spectrum of the noise, in each sub-band of frequency, performing a process as follows: determining whether the instantaneous SNR is higher than a predetermined threshold; if yes, returning the previous sub-band of frequency as the cutoff frequency and terminating the process; and if not, comparing a power of the noise below the current sub-band of frequency with a total power of the noise to determine whether the power of the noise below the current sub-band of frequency is greater than a threshold percentage of the total power of the noise; and if yes, setting the current sub-band of frequency as the cutoff frequency.

In some embodiments, lifting the spectrum of the speech that is within the noise dominant region of frequency to a sub-band of frequency higher than the cutoff frequency may further comprise: classifying a frame of the speech into one of the categories of vowel and consonant; and if the frame of the speech is classified as a vowel, lifting the spectrum of the frame of the speech that is within the noise dominant region of frequency to the sub-band of frequency higher than the cutoff frequency.

In some embodiments, the method may further comprise applying equalization on the lifted spectrum of the speech. In some embodiments, applying the equalization on the lifted speech may further comprise: transforming the spectrum of the speech from a linear frequency domain to critical bands of frequency domain, wherein a critical band of frequency is the band of frequency within which a first tone interferes with perception of a first tone; and performing equalization on the speech in the critical bands of frequency. In some embodiments, applying the equalization on the lifted speech may further comprise: adjusting the lifted spectrum of the speech based on loudness of the speech. In some embodiments, the method may further comprise applying spectra smoothing to the speech. In some embodiments, the adaptive filter may have a higher sparsity if the volume of noise is higher.

Another aspect of the present disclosure is directed to a speech communication system for improving speech intelligibility. The system may comprise: one or more processors and a memory storing instructions. The instructions, when executed by the one or more processors, may cause the system to perform: determining a cutoff frequency based on an estimation of a spectrum of noise, wherein the cutoff frequency defines a noise dominant region of frequency; lifting a spectrum of a speech above the noise dominant region of frequency, wherein a frequency range of the spectrum of the speech increases by the cutoff frequency; and applying an adaptive filter to the speech to achieve echo cancelation, wherein the adaptive filter is controlled by a volume of the noise.

Yet another aspect of the present disclosure is directed to a non-transitory computer-readable storage medium coupled to one or more processors and comprising instructions that, when executed by the one or more processors, cause the one or more processors to perform a method for speech communication, the method comprising: determining a cutoff frequency based on an estimation of a spectrum of noise, wherein the cutoff frequency defines a noise dominant region of frequency; lifting a spectrum of a speech that is within the noise dominant region of frequency to a sub-band of frequency higher than the cutoff frequency; and applying an adaptive filter to the speech to achieve echo cancelation, wherein the adaptive filter is controlled by a volume of the noise.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

BRIEF DESCRIPTION OF THE DRAWINGS

Preferred and non-limiting embodiments of the invention may be more readily understood by referring to the accompanying drawings in which:

FIG. 3 illustrates an exemplary algorithm for determining a cutoff frequency based on noise spectrum estimation, in accordance with various embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention.

Figure 1:
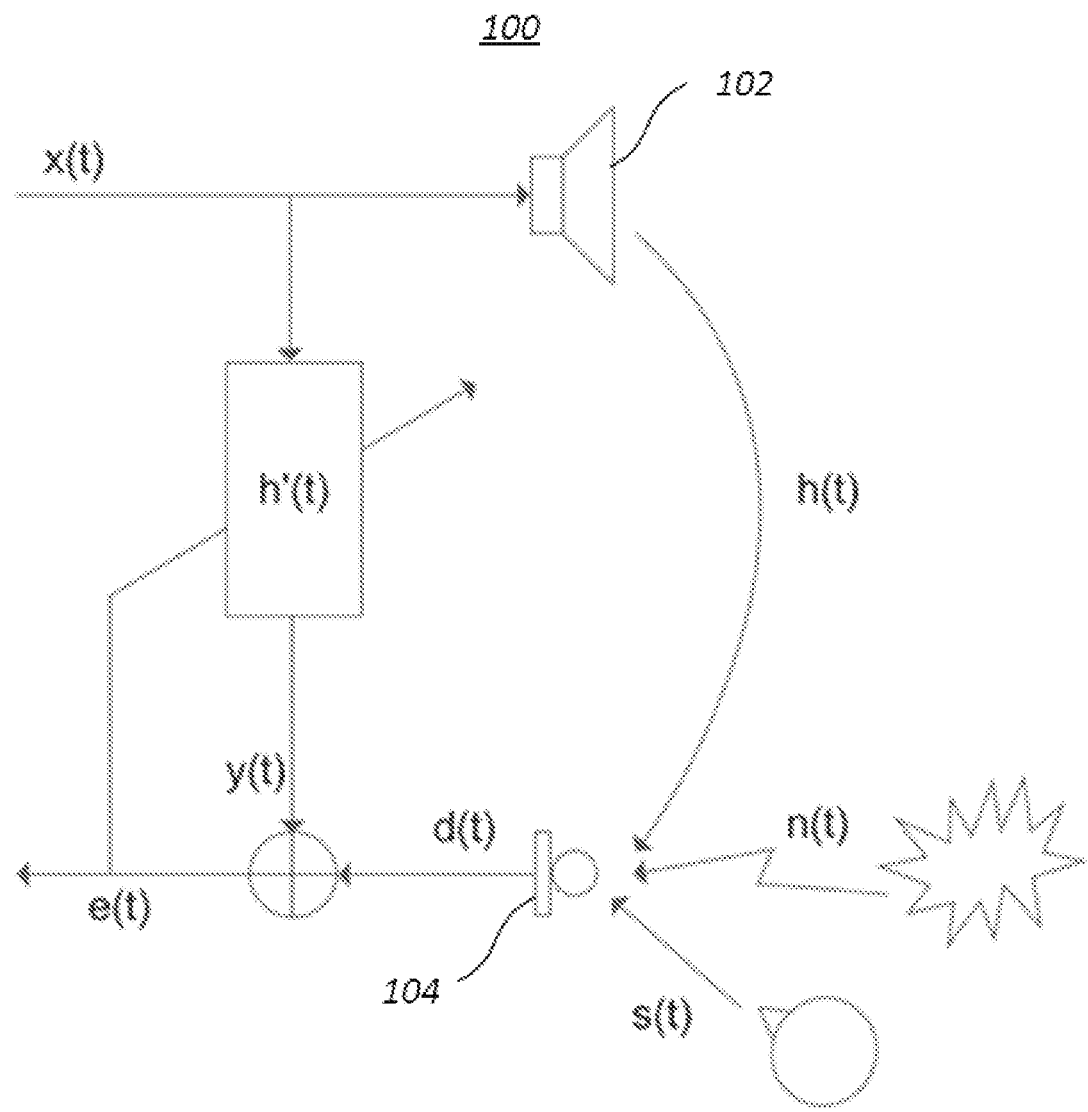
FIG. 1 illustrates a speech communication system, in accordance with various embodiments.

FIG. 1 illustrates a speech communication system 100. A speech communication system 100 may be equipped on a user device, e.g., a mobile phone, a tablet, a desktop computer, a wearable device (smart watch), etc. In some embodiments, the speech communication system 100 may be incorporated in a vehicle to enable a better user experience of phone conversation between drivers while driving vehicles. In the illustrated embodiments, the speech communication system 100 of FIG. 1 may be an adaptive echo cancellation (AEC) system 100. A far-end signal x(t) may be played back from a loudspeaker 102 of the speech communication system 100, go through room impulse response (RIR) h(t), and be picked up by a microphone 104 of the speech communication system 100. A microphone signal d(t) may also include a near-end speech signal s(t) and a background noise signal n(t) (also referred to as ambient noise). The microphone signal d(t) refers to the signal received by the microphone 104 of the speech communication system 100, and may be represented by the following equation (1):

$$d(t)=h(t)*x(t)+s(t)+n(t) \quad (1)$$

The AEC system 100 may be configured to cancel out the echo component along the acoustic path, represented by the RIR h(t), by using an estimated RIR h'(t) obtained from an adaptive filter. For example, the AEC system 100 may estimate an RIR h'(t) and use the h'(t) to estimate an echo signal y(t). By subtracting the estimated echo signal y(t) from the microphone signal d(t), the AEC system 100 may obtain an de-echoed signal e(t). Therefore, the de-echoed signal e(t) may be obtained according to equation (2) as follows.

$$\begin{aligned} e(t) &= d(t) - y(t) \\ &= d(t) - h'(t) * x(t) \\ &= (h(t) - h'(t)) * x(t) + s(t) + n(t) \end{aligned} \quad (2)$$

As illustrated in the embodiment of FIG. 1, if h'(t)=h(t), then the echo signal y(t) is removed and only the near-end signal s(t) is left with the ambient noise n(t). Various adaptive filter algorithms may be used to obtain the estimated RIR h'(t) by setting different cost functions, e.g., least mean square (LMS), affine projection (AP), recursive least square (RLS), etc. In some embodiments, an LMS based adaptive filter may be used in real-time applications due to its simplicity and light computation load. Equation (3) provides its update function.

$$h'(t+1)=h'(t)+\mu e(t)\underline{x}(t) \quad (3)$$

where μ is the step size controlling the adaptation rate, and $\underline{x}(t)$ may be the transpose or conjugate transpose of x(t). In some embodiments, frequency domain sub-band AEC filters may be widely used due to their advantages in reducing computational cost and improving convergence speed.

However, challenges for the traditional AEC system in vehicles, such as the system 100, may include that during phone conversations in moving vehicles, speech of users from the loudspeakers may often be corrupted by various noises including, e.g., engine noise, wind noise, etc. Most of the noises in moving vehicles may concentrate in low frequencies. In addition, speech signals also concentrate in low frequencies, and may be often masked by the various noises, resulting in significant degrade of speech intelligibility.

Figure 2:
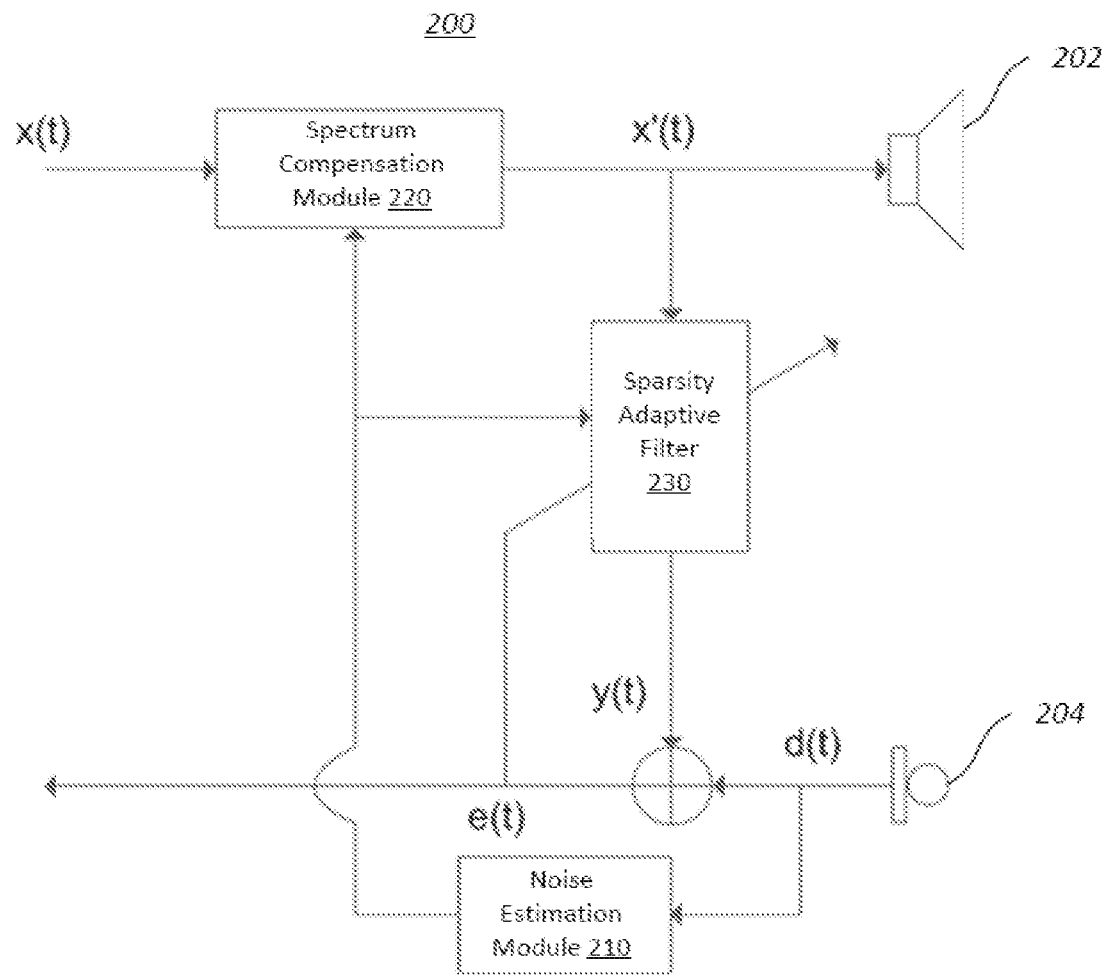
FIG. 2 illustrates an exemplary speech communication system for improving speech intelligibility, in accordance with various embodiments.

FIG. 2 illustrates an exemplary speech communication system 200 for improving speech intelligibility, in accordance with various embodiments. As illustrated, the speech communication system 200 may include a noise estimation module 210, a spectrum compensation module 220 and a sparsity adaptive filter 230. In some embodiments, the speech communication system 200 may include a near-end computing device including a microphone 204, the noise estimation module 210 and the sparsity adaptive filter 230. In addition, the speech communication system 200 may include a far-end computing device including a loudspeaker 202 and the spectrum compensation module 220. In some embodiments, the near-end computing device and the far-end computing device may be integrated into one computing device.

In some embodiments, the speech communication system 200, the near-end computing device, the far-end computing device and/or the integrated one computing device may include one or more processors and memory (e.g., permanent memory, temporary memory). The processor(s) may be configured to perform various operations by interpreting machine-readable instructions stored in the memory, e.g., the noise estimation module 210, the spectrum compensation module 220 and the sparsity adaptive filter 230, etc. The speech communication system 200, the near-end computing device, the far-end computing device or the integrated one computing device may include other computing resources and/or have access (e.g., via one or more connections/networks) to other computing resources.

In some embodiments, the performance of certain of the operations of the speech communication system 200 may be distributed among the processors, not only residing within a single machine, but deployed across a number of machines. In some exemplary embodiments, the processors or processor-implemented engines may be located in a single geographic location (e.g., within a home environment, an office environment, or a server farm). In other example embodiments, the processors or processor-implemented engines may be distributed across a number of geographic locations.

Most of ambient noise in vehicles concentrates in low frequencies. For example, the frequency of road noise may range up to 1.5 k Hz. Unfortunately, frequency around 1.5 k Hz also has more contribution to speech intelligibility. The existence of such ambient noise greatly degrades the speech perceptual quality, and more importantly, speech intelligibility. Therefore, the noise estimation module 210 may be configured to estimate spectra of noises in the microphone signals to detect noise dominant frequency regions and/or cutoff frequencies (which define the noise dominant frequency regions). In some embodiments, a noise dominant frequency region may be defined as a region in the spectrum of the noise with frequencies that are lower than or no greater than a cutoff frequency. The noise dominant frequency region may also be defined as a frequency region of the noise spectrum, which starts with a frequency of zero and ends with the cutoff frequency, and within which the power of noise occupies a predefined percentage (also referred to as a threshold percentage, hereinafter), e.g., 60%, 65%, 70%, 75%, 80%, 90%, etc., of the total power of the noise spreading over all frequencies.

Referring to FIG. 3, an exemplary algorithm for determining a cutoff frequency based on noise spectrum estimation is illustrated, in accordance with various embodiments. In some embodiments, the noise estimation module 210 may receive a sound signal through the microphone of the speech communication system 200. The noise estimation module 210 may estimate spectrum of the noise in the sound signal. For example, the noise estimation module 210 may use a minimum statistical method to estimate the spectrum of the noise based on optimal smoothing and minimum statistics. In addition, the noise estimation module 210 may estimate Signal-Noise-Ratios (SNRs) of the sound signal. For example, the SNRs are instantaneous SNRs for multiple frames of the sound signal and/or for multiple sub-bands of frequency of the sound signal. A sub-band of frequency may refer to a sub-range of frequencies over which the sound signal may have power. The spectrum of a sound signal may have multiple sub-bands. In some embodiments, a sub-band of the frequencies may be of different sizes, e.g., 1 Hz, 5 Hz, 10 Hz, 100 Hz, etc. The noise estimation module 210 may further smooth the SNRs over frames and/or adjacent sub-bands of frequency. In some embodiments, the noise estimation module 210 may search for a cutoff frequency based on the spectrum of the noise and the SNRs.

In the illustrated embodiments of FIG. 3, the noise estimation module 210 may start searching for the cutoff frequency from a low sub-band of frequency, e.g., a sub-band of 1 Hz. An upper frequency limit for the search may also be set. For example, the noise estimation module 210 may search up to a frequency sub-band of 1500 Hz. Other start and end frequencies, and other sizes of sub-band for the search of the cutoff frequency, if appropriate, may be possible for the application and should be recognized by one of ordinary skills in the related art. Starting from the low sub-band of frequency, in each current sub-band, the noise estimation module 210 may determine if the instantaneous SNR of the current sub-band is higher than a predetermined threshold, e.g., 10 dB, etc. If the noise estimation module 210 determines that the instantaneous SNR of the current sub-band is higher than the predetermined threshold, the noise estimation module 210 may terminate the search and return the previous sub-band of frequency as the cutoff frequency.

Otherwise, if the noise estimation module 210 determines that the instantaneous SNR of the current sub-band is no higher than the predetermined threshold, the noise estimation module 210 may calculate a power of the noise with frequencies below the current sub-band of frequency. The noise estimation module 210 may further compare the power of the noise with frequencies below the current sub-band of frequency with the total power of the noise. For example, the total power of the noise may be the power of the noise spreading over the whole frequency band (e.g., including all the frequencies where the noise has non-zero amplitudes, or including the frequencies where the noise has amplitudes above a small predetermined value), and calculated by the noise estimation module 210 beforehand. Additionally, the noise estimation module 210 may determine whether the power of the noise below the current sub-band of frequency is greater than a threshold percentage of the total power of the noise. For example, the threshold percentage may be preset as 60%, 65%, 70%, 75%, 80%, 90%, etc.

If the noise estimation module 210 determines that the power of the noise below the current sub-band of frequency is greater than the threshold percentage of the total power of the noise, the noise estimation module 210 may set the current sub-band of frequency as the cutoff frequency. If the noise estimation module 210 determines that the power of the noise below the current sub-band of frequency is not greater than the threshold percentage of the total power of the noise, the noise estimation module 210 may move to the next sub-band of frequency and repeat the operations described above, until the noise estimation module 210 finds the cutoff frequency based on the threshold percentage.

After the noise estimation module 210 determines the cutoff frequency, the noise dominant region is defined, e.g., the range from zero to the cutoff frequency. Referring back to FIG. 2, the spectrum compensation module 220 may utilize the cutoff frequency to perform spectrum compensation to received speech. For example, the speech in the noise dominant region may be compensated to a higher sub-band. Now referring to FIG. 4, an exemplary spectrum compensation process is illustrated, in accordance with various embodiments. A cutoff frequency based weight may control the spectrum compensation process. A lower cut-off frequency, indicating less noise dominant or a higher SNR, leads to a smaller weight, and thus the output x' (e.g., the compensated speech signal) relies more on original input x (e.g., the received speech signal), and vice versa. If cut-off frequency is zero, then the spectrum compensation process shown in FIG. 4 is bypassed and therefore x'=x.

Figure 4:
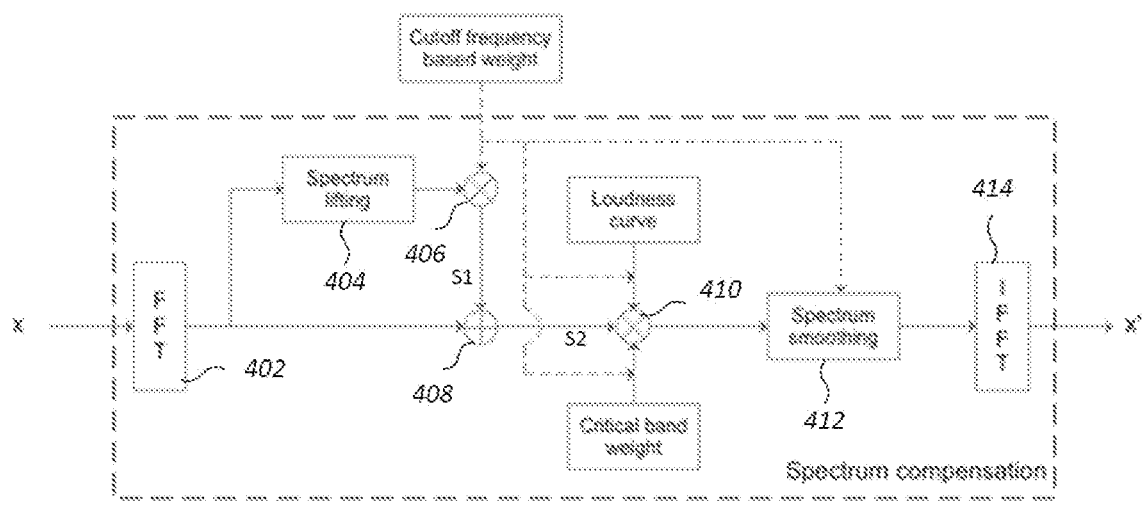
FIG. 4 illustrates an exemplary spectrum compensation process, in accordance with various embodiments.

As shown in FIG. 4, the spectrum compensation module 220 may receive the far-end reference speech signal x(t) (also referred to as x) before it is played back in the loudspeaker 202. At block 402, the spectrum compensation module 220 may perform a Fast Fourier transform (FFT) on the speech signal x to obtain a frequency spectrum of the signal x. At block 404, the spectrum compensation module 220 may lift the frequency spectrum of the speech signal x above noise dominant region. For example, the spectrum compensation module 220 may classify a frame of the speech signal x(t) into one of the categories including, e.g., vowel and consonant. The reason is that consonant usually is with higher frequencies and has less chance to be masked by the ambient noise, and thus the lifting process may be bypassed in order to achieve natural perceptual quality. In some embodiments, if the current frame is classified as vowel, the spectrum of the frame may be lifted out of the noise dominant region of frequency. For example, the noise-masked spectra of the speech is lifted to a higher sub-band, e.g., above 3.5 k Hz, since frequency component above 3.5 k Hz contributes less to speech intelligibility.

In some embodiments, as shown at step 406, the lifted spectrum of the speech may be multiplied by the cutoff frequency based weight. The output spectrum of step 406 may be represented by S1. At step 408, the original spectrum of the speech obtain at block 402 may be combined with (e.g., added to) the output of step 406 S1 to obtain an output spectrum S2. In other embodiments, the spectrum is lifted by adding the value of the cutoff frequency (or a value larger than the cutoff frequency) to the current frequency. In some embodiments, the spectrum compensation module 220 may also compress the spectrum of the speech to make the spectrum spread over a range from the cutoff frequency to the same highest frequency as the pre-lift spectrum.

At block 410, the spectrum compensation module 220 may perform equalization on the output spectrum S2 based on a critical band weight as well as loudness curves, and thus obtain an output spectrum S3. In some embodiments, the spectrum compensation module 220 may apply equalization to the lifted spectrum of the speech to adjust the balance between different frequency components within the speech signal. For example, the spectrum compensation module 220 may transform the spectrum of the speech from a linear frequency domain to critical bands of frequency domain (or Mel frequency). Mel frequencies may be used to distinguish between frequencies, and specifically between sounds. Mel frequency may be utilized for critical bands. The concept of critical bands describes the frequency bandwidth of the "auditory filter" created by the cochlea, the sense organ of hearing within the inner ear. A critical band of frequency may refer to the band of frequency within which one tone interferes with perception of another tone by auditory masking. Process in critical bands may achieve better perceptual and intelligible quality than process in linear sub-bands. Transforming a signal into the Mel frequency domain may include cepstrum analysis, or otherwise include taking the Fourier transform of the log of the input. Mel frequency cepstral coefficients (MFCC) used in automatic speech recognition (ASR) may also be used to facilitate the equalization of the speech spectrum. For example, the spectrum compensation module 220 may transform the spectrum of the speech from a linear frequency domain to Mel frequency domain and operate the equalization in critical sub-bands.

Figure 5:
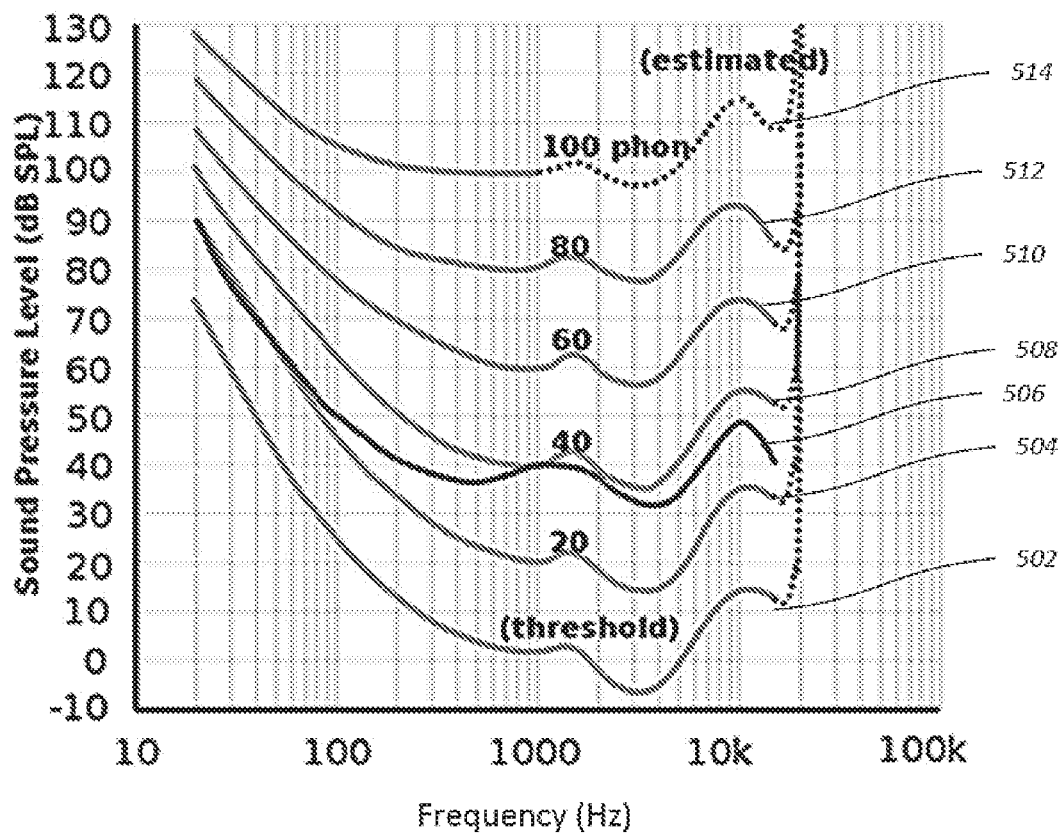
FIG. 5 illustrates equal loudness contours, in accordance with various embodiments.

In addition, the spectrum compensation module 220 may adjust the lifted spectrum of speech based on loudness of the speech signal x(t). In acoustics, loudness is the subjective perception of sound pressure. The sensitivity of the human ear changes as a function of frequency, as shown in the FIG. 5. Referring to FIG. 5, equal loudness contours are illustrated, in accordance with various embodiments. Each curve 502, 504, 506, 508, 510, 512, 514, shows the sound pressure level (SPL) required for speeches at different frequencies to be perceived as equally loud, while different curves 502, 504, 506, 508, 510, 512, 514, are pertain to different sound pressure levels. The curve 508 is calculated bases on a standard different from that for other curves. As indicated by FIG. 5, based on the curve of the sound pressure level of 60 phon, if the spectrum of the speech at 500 Hz is lifted to 3.5 k Hz, the spectrum may be attenuated by approximately 5 dB to achieve a better (natural) perceptual sound.

Besides critical bands and loudness, the equalization may also be affected by a noise volume dependent controller. In some embodiments, the spectrum compensation module 220 may apply a gain proportional to the noise level/volume to the lifted spectrum of speech, to further enhance the speech intelligibility. For example, if the ambient noise is of a high volume, a larger gain may be applied. On the other hand, when there is little noise, no gain is applied and equalization may be controlled by a critical bands and loudness based controller.

Referring back to FIG. 4, at block 412, the spectrum compensation module 220 may perform spectra smoothing on the output of block 410, S3. Adding low frequency components to the original spectra (as have done in the lifting steps, e.g., at block 408) may introduce amplitude discontinuity, and lead to audible distortion. e.g., hissing sound. Therefore, the spectrum compensation module 220 may perform spectra smoothing to overcome these disadvantages. A small frequency region (e.g., two adjacent sub-band, five adjacent sub-bands, ten adjacent sub-bands, etc.) below and above 3.5 k Hz are compared by their power. A gain may be applied to the spectra above 3.5 k Hz to make sure that the two small frequency regions described above have equal power.

Figure 6:
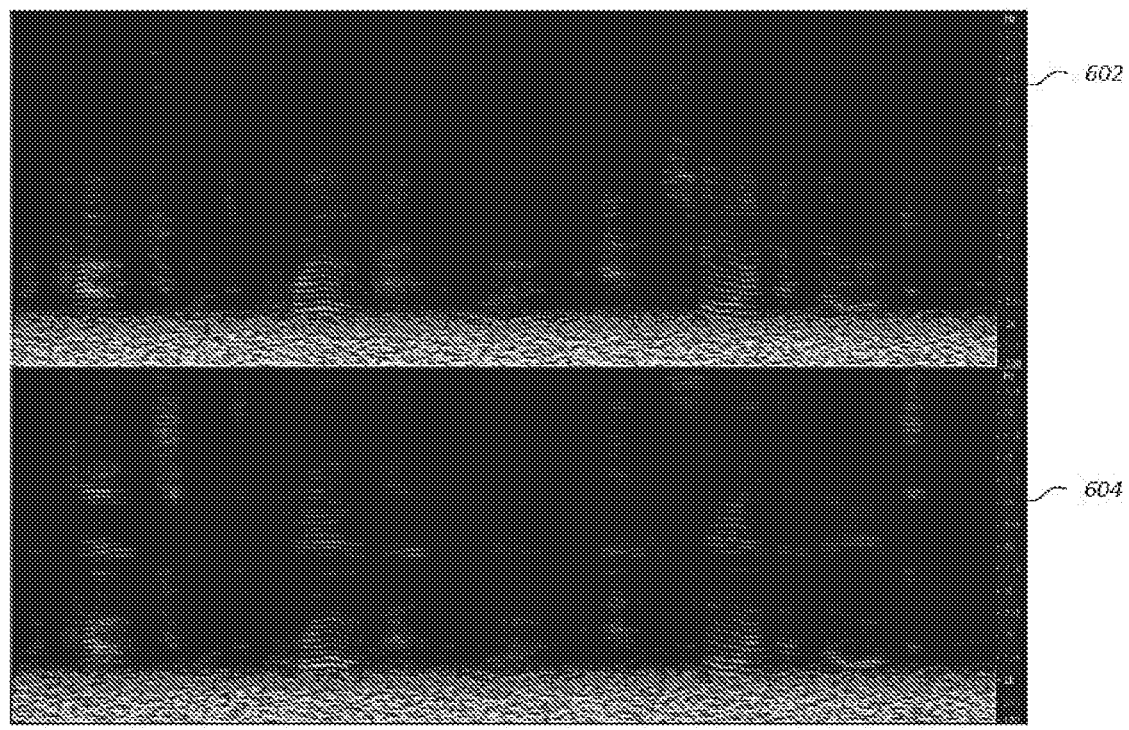
FIG. 6 illustrates an exemplary spectrum compensation result, in accordance with various embodiments.

FIG. 6 illustrates an exemplary spectrum compensation result, in accordance with various embodiments. As shown in FIG. 6, the upper portion 602 represents the spectra of the raw input (e.g., the speech signal before spectrum compensation). In the raw input, ambient noise is dominant below 1.5 k Hz and the speech within or nearby that region is masked by the noise. The lower portion of FIG. 6, 604, represents the spectra of the signal after the spectrum compensation has been performed on it. After spectrum compensation, the low frequency speech signal masked by the noise is lifted to higher sub-bands, and the speech power is moved to high frequency spectrum based on loudness curve and critical band weight. Therefore, the speech is well isolated from the noise, achieving better intelligibility of the speech.

The overall power of the received speech before and after the process are the same, distinguishing from results based on methods simply boosting the volume of the speech. At block 414, the spectrum compensation module 220 may perform an Inverse Fast Fourier transform (FFT) on the smoothed spectrum S3 to obtain the compensated speech signal x' (t) (also referred to as x').

Referring back to FIG. 2, the sparsity adaptive filter 230 at the near end may apply an adaptive filter to the speech to achieve echo cancellation. In some embodiments, the sparsity adaptive filter 230 may receive the speech signal x'(t) output by the spectrum compensation module 220. For example, the speech signal x'(t) has been processed by the spectrum compensation module 220 as described above, e.g., lifted and compensated in frequency domain. The sparsity adaptive filter 230 may filter the speech signal x'(t) to obtain an estimated echo signal y(t). In some embodiments, the adaptive filter is controlled by a volume of the noise. For example, the adaptive filter has a higher sparsity if the volume of noise is higher.

The sparsity adaptive filter 230 may use proportionate based algorithms or penalty function based algorithms. Based on the penalty function based algorithms, a penalty function $F_\beta$ describing the sparsity may be added into the cost function C as shown below:

$$C = \frac{1}{2}|e^2| + \alpha F_\beta \quad (4)$$

$$F_\beta(z) = \sum_{n \in N} 1 - \frac{1}{1 + \beta|z_n|} \quad (5)$$

where, z is a vector and $z=[z_0\ z_1\ \ldots\ z_n]$, $\beta$ is a parameter responsible for controlling the compromise between quality of the approximation and smoothness of $F_\beta$, $\alpha$ is a constant to control the weight of the penalty function $F_\beta$. A gradient-based filter may be derived correspondingly as follows:

$$h'^{(t+1)} = h'^{(t)} + \mu e(t)x(t) + \alpha f_\beta \quad (6)$$

$$F_\beta(z_n) = \frac{\beta\ \text{sign}\ (z_n)}{(1 + \beta|z_n|)^2} \quad (7)$$

where $\alpha$ is a constant to control the weight of the penalty function $f_\beta$. The larger $\alpha$ indicates the more sparsity the adaptive filter may be towards, leading to more residue echo but less computation. In the proposed algorithm, $\alpha$ is controlled by the obtained SNR and thus controlled by the volume of noise. Therefore, through a, the sparsity adaptive filter 230 is controlled by the volume of noise as indicated by the equation (6). For example, if ambient noise is low, a full adaption may be deployed to achieve better echo cancellation; if ambient noise is high, only large coefficients are adapted according to a, and thus computation can be reduced.

Figure 7:
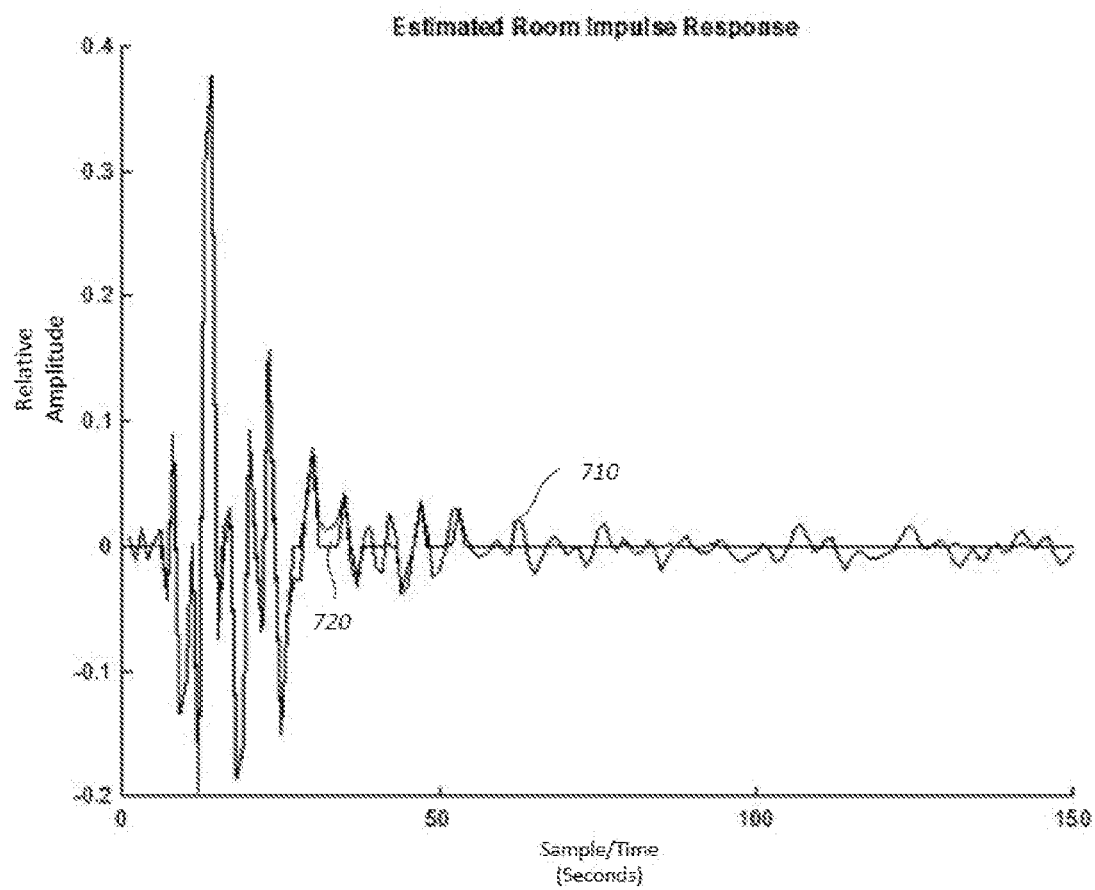
FIG. 7 illustrates estimated room impulse response from full and sparse adaptation, in accordance with various embodiments.

Referring to FIG. 7, illustrated is an estimated room impulse response from full and sparse adaptation, in accordance with various embodiments. As shown in FIG. 7, the estimated room impulse response from full adaptation 710 and the estimated room impulse response from sparse adaptation 720 are compared. The estimated room impulse response from full adaptation 710 means that when deriving the filter h'(t) (the estimated room impulse response), all the coefficients in the filter matrix h'(t) may be adapted with sample or time t. For example, the coefficients at one sample or time may be changed from values at the prior sample or time, and keep changing until they converge under an algorithm (e.g., least mean square (LMS), affine projection (AP), recursive least square (RLS), etc.). The estimated room impulse response from sparse adaptation 720 means that when deriving the filter h'(t) (the estimated room impulse response), not all the coefficients in the filter matrix h'(t), but only those of a value above a threshold, such as the noise floor, e.g., 0.05, 0.02, 0.01, etc., may be adapted with sample or time t. The coefficients below the threshold (also referred to as small coefficients) may be unchanged, or set to zero. That is, the sparsity adaptive filter freezes the adaptation of small coefficients. In some embodiments, a noise floor may refer to the measure of the signal created from the sum of all the noise sources and unwanted signals within a measurement system, e.g., within a vehicle.

In the noise-free and linear echo scenario, the mis-adjustment can be very small once the filter is converged. However, when ambient noise exists, the mis-adjustment can only decrease to the same level of the noise floor. Under such condition, only large adaptive filter coefficients contribute to the echo cancellation, and adaptation of small coefficients is wasted effort. Therefore, by freezing the adaptation of small coefficients below the noise floor, the computation cost may be reduced.

Figure 8:
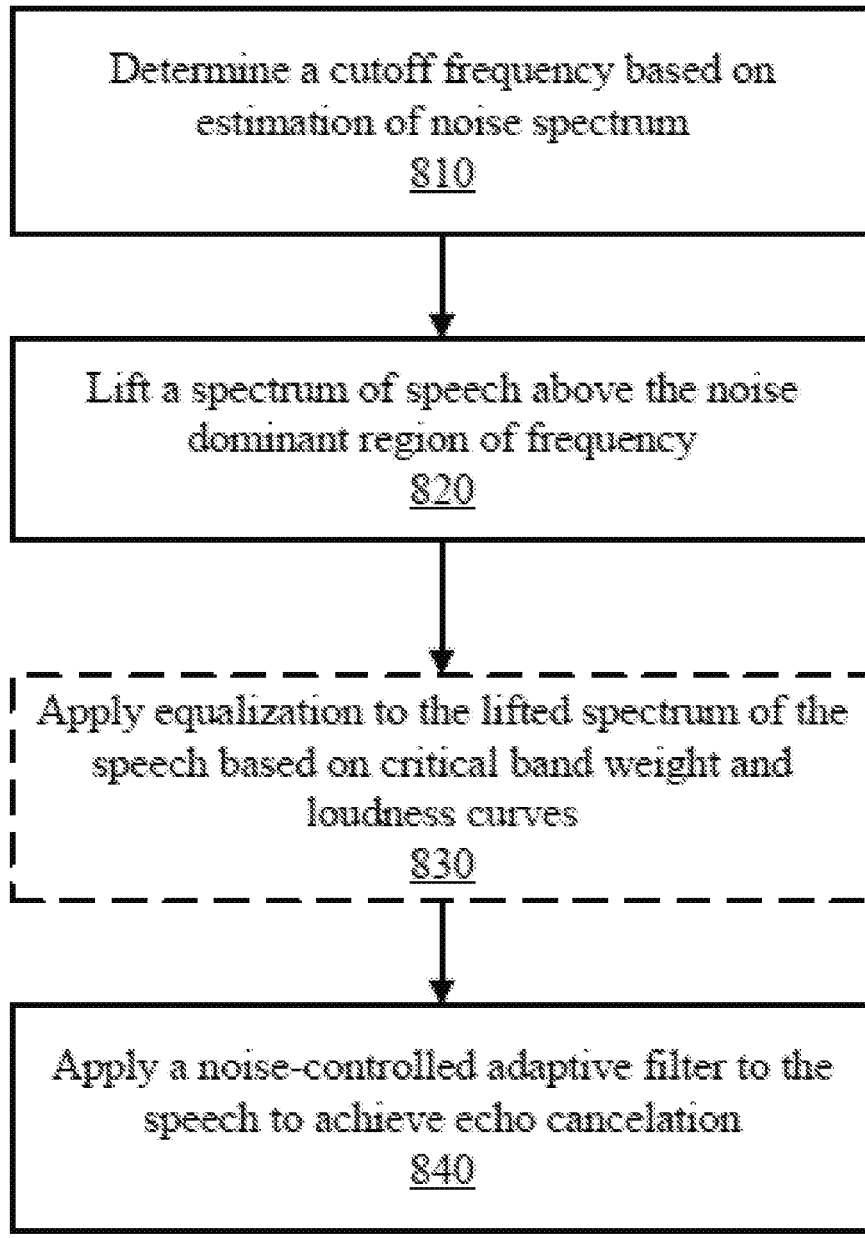
FIG. 8 is a flow chart illustrating an exemplary method for speech communication with improved speech intelligibility, in accordance with various embodiments.

FIG. 8 is a flowchart illustrating an exemplary method 800 for speech communication with improved speech intelligibility, in accordance with various embodiments. The method 800 may be implemented in various systems including, for example, the system of FIG. 2. The operations of the method 800 presented below are intended to be illustrative. Depending on the implementation, the method 800 may include additional, fewer, or alternative steps performed in various orders or in parallel. The method 800 may be implemented in various computing systems or devices including one or more processors.

With respect to the method 800, at block 810, a cutoff frequency may be determined based on estimation of a spectrum of noise. For example, the cutoff frequency defines a noise dominant region of frequency. At block 820, a spectrum of speech may be lifted above the noise dominant region of frequency. For example, a frequency range of the spectrum of the speech increases by the cutoff frequency. At block 830, optionally, equalization may be applied to the lifted spectrum of the speech based on critical band weight and loudness curves. At block 840, an adaptive filter may be applied to the speech to achieve echo cancellation.

Figure 9:
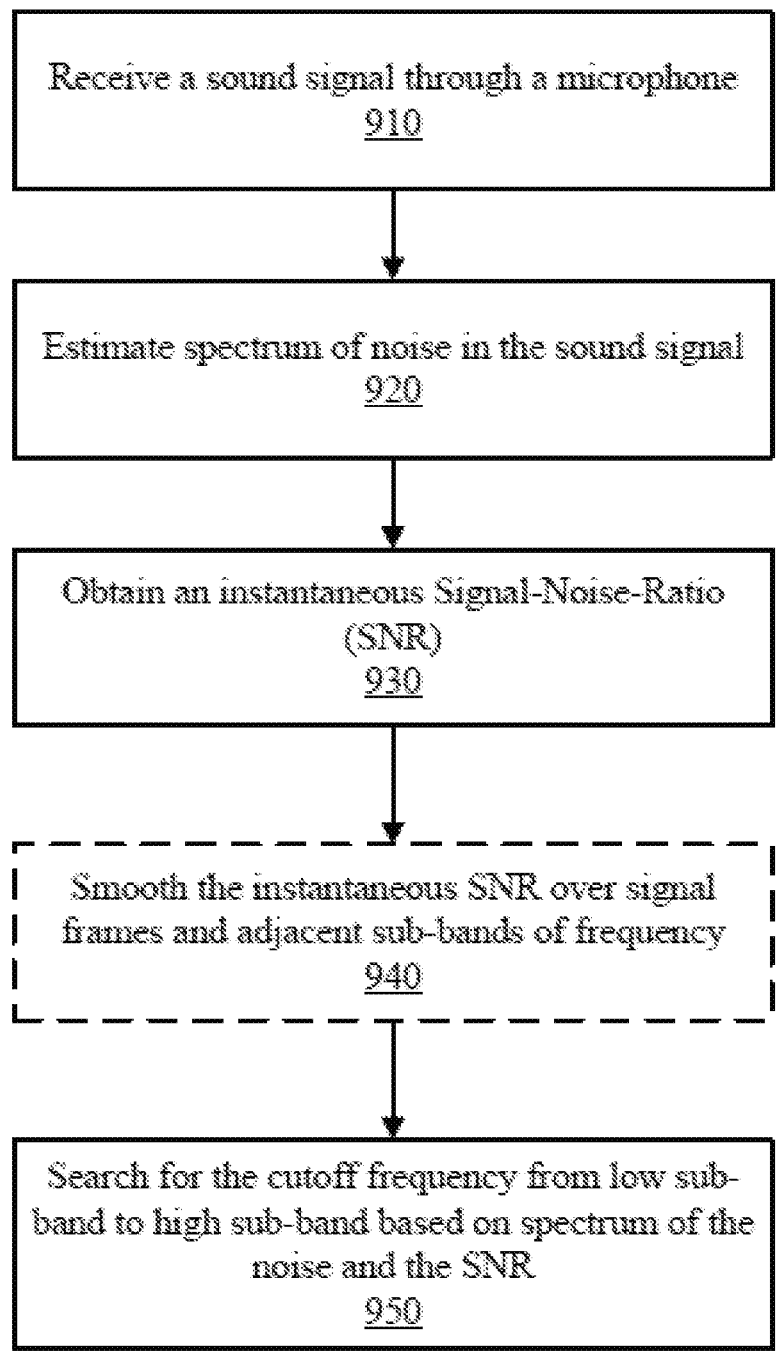
FIG. 9 is a flow chart illustrating an exemplary method for determining a cutoff frequency based on noise spectrum estimation, in accordance with various embodiments.

FIG. 9 is a flowchart illustrating an exemplary method 810 for determining a cutoff frequency based on noise spectrum estimation, such as the step 810 in method 800, in accordance with various embodiments. The method 810 may be implemented in various systems including, for example, the system of FIG. 2. The operations of the method 810 presented below are intended to be illustrative. Depending on the implementation, the method 810 may include additional, fewer, or alternative steps performed in various orders or in parallel. The method 810 may be implemented in various computing systems or devices including one or more processors.

With respect to the method 810, at block 910, a sound signal may be received through a microphone of the system. At block 920, the spectrum of noise in the sound signal may be estimated. At block 930, an instantaneous Signal-Noise-Ratio (SNR) may be obtained. Optionally, at block 940, the instantaneous SNR may be smoothed over frames of speech/sound signal and adjacent sub-bands of frequency. At block 950, the cutoff frequency may be searched for from a low sub-band to a high sub-band based on spectrum of the noise and the SNR.

Figure 10:
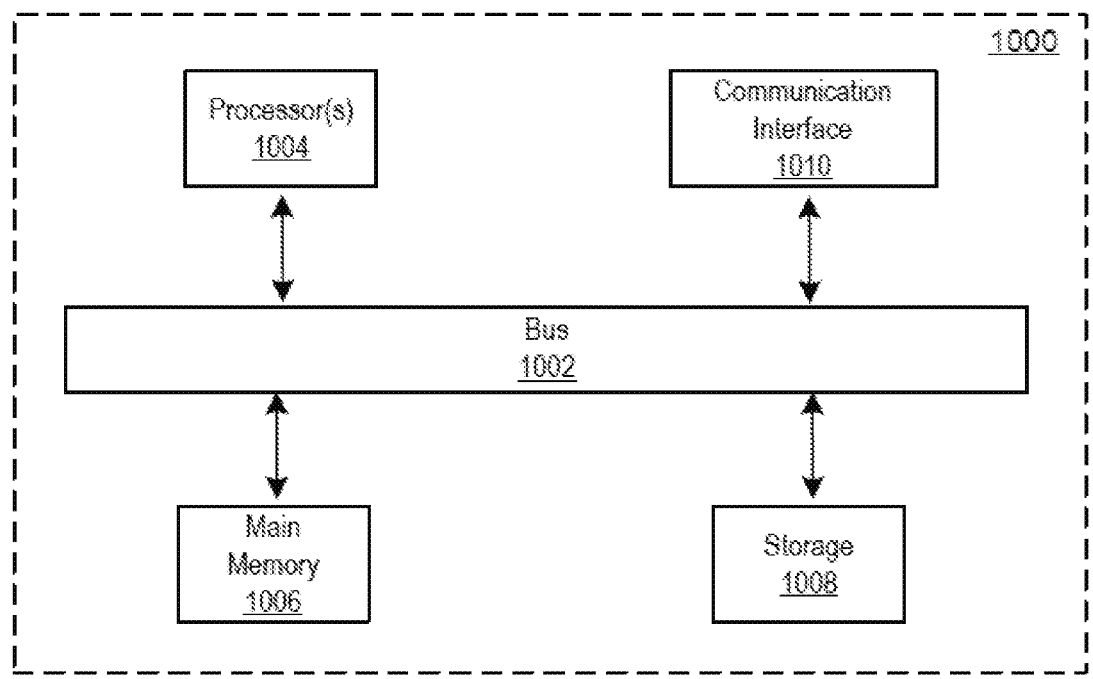
FIG. 10 is a block diagram that illustrates an exemplary computer system in which any of the embodiments described herein may be implemented.

FIG. 10 is a block diagram that illustrates a computer system 100 upon which any of the embodiments described herein may be implemented. For example, the speech communication system as described above with reference to FIG. 1 may be implemented by the computer system 1000. In another example, the exemplary speech communication system for improving speech intelligibility may be implemented by the computer system 1000. The computer system 1000 may include a bus 1002 or other communication mechanism for communicating information, one or more hardware processors 1004 coupled with bus 1002 for processing information. Hardware processor(s) 1004 may be, for example, one or more general purpose microprocessors.

The computer system 1000 also may include a main memory 1006, such as a random access memory (RAM), cache and/or other dynamic storage devices, coupled to bus 1002 for storing information and instructions to be executed by processor(s) 1004. Main memory 1006 also may be used for storing temporary variables or other intermediate information during execution of instructions to be executed by processor(s) 1004. Such instructions, when stored in storage media accessible to processor(s) 1004, render computer system 1000 into a special-purpose machine that is customized to perform the operations specified in the instructions. Main memory 1006 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, and networked versions of the same.

The computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor(s) 1004 executing one or more sequences of one or more instructions contained in main memory 1006. Such instructions may be read into main memory 1006 from another storage medium, such as storage device 1008. Execution of the sequences of instructions contained in main memory 1006 causes processor(s) 1004 to perform the process steps described herein. In alternative embodiments, hard-wired circuitry may be used in place of or in combination with software instructions.

The computer system 1000 also may include a communication interface 1010 coupled to bus 1002. Communication interface 1010 provides a two-way data communication coupling to one or more network links that are connected to one or more networks. As another example, communication interface 1010 may be a local area network (LAN) card to provide a data communication connection to a compatible LAN (or WAN component to communicated with a WAN). Wireless links may also be implemented.

The computer system 1000 may be used to implement the embodiments of the present disclosure. For example, the methods, modules, units, blocks, etc. as described above may be implemented as software (i.e., instructions) that is stored in the memory 1006 and/or storage 1008. When the instructions are executed by the processor 1004, the computer system 1000 performs the methods. Alternatively, the methods, modules, units, blocks, etc. as described above may be implemented using customized hard-wired logic. ASICs, FPGAs. and/or firmware in the computer system 1000.

Certain embodiments are described herein as including logic or a number of components. Components may constitute either software components (e.g., code embodied on a machine-readable medium) or hardware components (e.g., a tangible unit capable of performing certain operations which may be configured or arranged in a certain physical manner).

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

The flowcharts described in this paper illustrate modules (and potentially decision points) organized in a fashion that is conducive to understanding. It should be recognized, however, that the modules may be reorganized for parallel execution, reordering, modification (change, remove, or augment), where circumstances permit.

What is claimed is:

1. A speech communication system for improving speech intelligibility, comprising:
   one or more processors; and
   a memory storing instructions that, when executed by the one or more processors, cause the system to perform:
   determining a cutoff frequency based on a spectrum of noise in a sound signal and Signal-Noise-Ratios (SNRs) of a plurality of sub-bands of frequency of the sound signal, wherein the cutoff frequency defines a noise dominant region of frequency, and the determining comprises, from a lowest sub-band of frequency to an upper frequency limit of the spectrum of the noise, in each of the plurality of sub-bands of frequency:
   determining whether an SNR of the sub-band is higher than a threshold, and in response to determining that the SNR is higher than the threshold, determining a previous sub-band of frequency as the cutoff frequency;
   lifting a spectrum of a speech above the noise dominant region of frequency, wherein a frequency range of the spectrum of the speech is lifted by the cutoff frequency; and applying an adaptive filter to the speech to achieve echo cancelation, wherein the adaptive filter is controlled by a volume of the noise.

2. The system according to claim 1, wherein the sound signal is received through a microphone of the system.

3. The system of claim 1, wherein the SNRs are instantaneous SNRs, and wherein the instantaneous SNRs are smoothed over frames of the sound signal and adjacent sub-bands of frequency.

4. The system of claim 3, wherein determining the cutoff frequency based on the spectrum of the noise and the SNRs further comprises:
in response to determining that the SNR is not higher than the threshold, determining whether a power of the noise below the sub-band of frequency is greater than a threshold percentage of a total power of the noise; and
in response to determining that the power of the noise below the sub-band of frequency is greater than the threshold percentage of the total power of the noise, setting the current sub-band of frequency as the cutoff frequency.

5. The system of claim 1, wherein lifting a spectrum of a speech above the noise dominant region of frequency further comprises:
classifying a frame of the speech into one of the categories of vowel and consonant; and
if the frame of the speech is classified as a vowel, lifting the spectrum of the frame of the speech to a sub-band of frequency based on the cutoff frequency.

6. The system of claim 1, wherein the instructions, when executed by the one or more processors, further cause the system to perform:
applying equalization to the lifted spectrum of the speech.

7. The system of claim 6, wherein applying the equalization on the lifted speech further comprises:
transforming the spectrum of the speech from a linear frequency domain to critical bands of frequency domain, wherein a critical band of frequency is a band of frequency within which a first tone interferes with perception of a second tone; and
performing equalization on the speech in the critical bands of frequency.

8. The system of claim 6, wherein applying the equalization on the lifted speech further comprises:
adjusting the lifted spectrum of the speech based on loudness of the speech.

9. The system of claim 6, wherein the instructions, when executed by the one or more processors, further cause the system to perform:
applying spectra smoothing to the speech.

10. The system of claim 1, wherein a sparsity of the adaptive filter increases if the volume of noise increases.

11. A computer-implemented method for speech communication, comprising:
determining a cutoff frequency based on a spectrum of noise in a sound signal and Signal-Noise-Ratios (SNRs) of a plurality of sub-bands of frequency of the sound signal, wherein the cutoff frequency defines a noise dominant region of frequency, and the determining comprises, from a lowest sub-band of frequency to an upper frequency limit of the spectrum of the noise, in each of the plurality of sub-bands of frequency:
determining whether an SNR of the sub-band is higher than a threshold, and
in response to determining that the SNR is higher than the threshold, determining a previous sub-band of frequency as the cutoff frequency;
lifting a spectrum of a speech above the noise dominant region of frequency, wherein a frequency range of the spectrum of the speech is lifted by the cutoff frequency; and
applying an adaptive filter to the speech to achieve echo cancelation, wherein the adaptive filter is controlled by a volume of the noise.

12. The method of claim 11, wherein the sound signal is received through a microphone of the system.

13. The method of claim 11, wherein the SNRs are instantaneous SNRs, and wherein the instantaneous SNRs are smoothed over frames of the sound signal and adjacent sub-bands of frequency.

14. The method of claim 13, wherein determining the cutoff frequency based on the spectrum of the noise and the SNRs further comprises:
in response to determining that the SNR is not higher than the threshold, determining whether a power of the noise below the sub-band of frequency is greater than a threshold percentage of a total power of the noise; and
in response to determining that the power of the noise below the sub-band of frequency is greater than the threshold percentage of the total power of the noise, setting the current sub-band of frequency as the cutoff frequency.

15. The method of claim 11, wherein lifting the spectrum of the speech that is within the noise dominant region of frequency to a sub-band of frequency higher than the cutoff frequency further comprises:
classifying a frame of the speech into one of the categories of vowel and consonant; and
if the frame of the speech is classified as a vowel, lifting the spectrum of the frame of the speech that is within the noise dominant region of frequency to the sub-band of frequency higher than the cutoff frequency.

16. The method of claim 11, further comprising:
applying equalization on the lifted spectrum of the speech.

17. The method of claim 16, wherein applying the equalization on the lifted speech further comprises:
transforming the spectrum of the speech from a linear frequency domain to critical bands of frequency domain, wherein a critical band of frequency is a band of frequency within which a first tone interferes with perception of a first tone; and
performing equalization on the speech in the critical bands of frequency.

18. The method of claim 16, wherein applying the equalization on the lifted speech further comprises:
adjusting the lifted spectrum of the speech based on loudness of the speech.

19. The method of claim 16, further comprising: applying spectra smoothing to the speech.

20. A non-transitory computer-readable storage medium coupled to one or more processors and comprising instructions that, when executed by the one or more processors, cause the one or more processors to perform a method for speech communication, the method comprising:
determining a cutoff frequency based on a spectrum of noise in a sound signal and Signal-Noise-Ratios (SNRs) of a plurality of sub-bands of frequency of the sound signal, wherein the cutoff frequency defines a noise dominant region of frequency, and the determining comprises, from a lowest sub-band of frequency to an upper frequency limit of the spectrum of the noise, in each of the plurality of sub-bands of frequency:
determining whether an SNR of the sub-band is higher than a threshold, and
in response to determining that the SNR is higher than the threshold, determining a previous sub-band of frequency as the cutoff frequency;

lifting a spectrum of a speech above the noise dominant region of frequency, wherein a frequency range of the spectrum of the speech is lifted by the cutoff frequency; and applying an adaptive filter to the speech to achieve echo cancelation, wherein the adaptive filter is controlled by a volume of the noise.

* * * * *

UNITED STATES PATENT AND TRADEMARK OFFICE
CERTIFICATE OF CORRECTION

PATENT NO. : 11,227,622 B2
APPLICATION NO. : 16/314526
DATED : January 18, 2022
INVENTOR(S) : Zhang et al.

Page 1 of 1

It is certified that error appears in the above-identified patent and that said Letters Patent is hereby corrected as shown below:

In the Claims

In Claim 4, Column 13, Line 22, "setting the current sub-band of frequency" should read --setting the sub-band of frequency--.

In Claim 14, Column 14, Line 28, "setting the current sub-band of frequency" should read --setting the sub-band of frequency--.

Signed and Sealed this
Eighth Day of March, 2022

Drew Hirshfeld
*Performing the Functions and Duties of the
Under Secretary of Commerce for Intellectual Property and
Director of the United States Patent and Trademark Office*